United States Patent
Wen

(10) Patent No.: US 7,525,910 B2
(45) Date of Patent: Apr. 28, 2009

(54) METHOD AND SYSTEM FOR NON-DISRUPTIVE DATA CAPTURE IN NETWORKS

(75) Inventor: William J. Wen, Austin, TX (US)

(73) Assignee: QLOGIC, Corporation, Aliso Viejo, CA (US)

( * ) Notice: Subject to any disclaimer, the term of this patent is extended or adjusted under 35 U.S.C. 154(b) by 456 days.

(21) Appl. No.: 10/889,635

(22) Filed: Jul. 12, 2004

(65) Prior Publication Data

US 2005/0015518 A1  Jan. 20, 2005

Related U.S. Application Data

(60) Provisional application No. 60/487,876, filed on Jul. 16, 2003, provisional application No. 60/487,887, filed on Jul. 16, 2003, provisional application No. 60/487,875, filed on Jul. 16, 2003, provisional application No. 60/490,747, filed on Jul. 29, 2003, provisional application No. 60/487,667, filed on Jul. 16, 2003, provisional application No. 60/487,665, filed on Jul. 16, 2003, provisional application No. 60/492,346, filed on Aug. 4, 2003, provisional application No. 60/487,873, filed on Jul. 16, 2003.

(51) Int. Cl.
*G01R 31/08* (2006.01)
*H04J 1/16* (2006.01)
*H04J 1/02* (2006.01)
*H04L 12/28* (2006.01)
*G06F 3/00* (2006.01)

(52) U.S. Cl. .................. 370/230; 370/235; 370/392; 710/1

(58) Field of Classification Search ............... 370/452, 370/258, 424, 454, 460, 906, 230, 235, 389, 370/392, 403–406, 488, 497; 710/15, 17, 710/62, 1
See application file for complete search history.

(56) References Cited

U.S. PATENT DOCUMENTS 4,162,375 A  7/1979  Schilichte ................. 179/15

(Continued)

FOREIGN PATENT DOCUMENTS

EP        0649098        9/1994

(Continued)

OTHER PUBLICATIONS

Clark, Tom, "Zoning for Fibre Channel Fabrics", Vixel Corporation Paper—XP002185194., (Aug. 1999), pp. 1-6.

(Continued)

*Primary Examiner*—Seema S Rao
*Assistant Examiner*—Xavier Szewai Wong
(74) *Attorney, Agent, or Firm*—Klein, O'Neill & Singh, LLP

(57) ABSTRACT

A method and fiber channel switch element for capturing data in a fiber channel system is provided. The method includes, detecting a condition for enabling data capture; setting a control bit to enable data capture; and capturing data based on the set control bit. The switch element includes, a diagnostic port that can configured as a traditional communication port and/or a data capture port depending on incoming frame data. The diagnostic port filters incoming frames, which is used to enable data capture.

8 Claims, 10 Drawing Sheets

U.S. PATENT DOCUMENTS

| | | | |
|---|---|---|---|
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,115,430 A | 5/1992 | Hahne et al. | |
| 5,144,622 A | 9/1992 | Takiyasu et al. | 370/85.13 |
| 5,258,751 A | 11/1993 | DeLuca et al. | |
| 5,260,933 A | 11/1993 | Rouse | |
| 5,260,935 A | 11/1993 | Turner | |
| 5,367,520 A | 11/1994 | Cordell | 370/60 |
| 5,425,022 A | 6/1995 | Clark et al. | |
| 5,537,400 A | 7/1996 | Diaz et al. | |
| 5,579,443 A | 11/1996 | Tatematsu et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,666,483 A | 9/1997 | McClary | |
| 5,677,909 A | 10/1997 | Heide | |
| 5,687,172 A | 11/1997 | Cloonan et al. | 370/395 |
| 5,732,206 A | 3/1998 | Mendel | |
| 5,748,612 A | 5/1998 | Stoevhase et al. | 370/230 |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,892,604 A | 4/1999 | Yamanaka et al. | |
| 5,925,119 A | 7/1999 | Maroney | |
| 5,936,442 A | 8/1999 | Liu et al. | |
| 5,954,796 A | 9/1999 | McCarty et al. | |
| 5,974,547 A | 10/1999 | Klimenko | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,031,842 A | 2/2000 | Trevitt et al. | |
| 6,046,979 A | 4/2000 | Bauman | |
| 6,047,323 A | 4/2000 | Krause | 709/227 |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,128,292 A | 10/2000 | Kim et al. | 370/356 |
| 6,134,127 A | 10/2000 | Kirchberg | |
| 6,144,668 A | 11/2000 | Bass et al. | |
| 6,147,976 A | 11/2000 | Shand et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,253,267 B1 | 6/2001 | Kim et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 | 10/2001 | Mills et al. | |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 * | 6/2002 | Stai et al. | 709/236 |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,467,008 B1 | 10/2002 | Gentry et al. | 710/261 |
| 6,470,026 B1 | 10/2002 | Pearson et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,553,036 B1 * | 4/2003 | Miller et al. | 370/462 |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,606,690 B2 | 8/2003 | Padovano | |
| 6,614,796 B1 | 9/2003 | Black et al. | |
| 6,622,206 B1 | 9/2003 | Kanamaru et al. | |
| 6,629,161 B2 | 9/2003 | Matsuki et al. | |
| 6,643,298 B1 | 11/2003 | Brunheroto et al. | |
| 6,684,209 B1 | 1/2004 | Ito et al. | |
| 6,697,359 B1 | 2/2004 | George | 370/357 |
| 6,697,914 B1 | 2/2004 | Hospodor et al. | |
| 6,718,497 B1 | 4/2004 | Whitby-Strevens | |
| 6,744,772 B1 | 6/2004 | Eneboe et al. | |
| 6,760,302 B1 | 7/2004 | Ellinas et al. | |
| 6,779,083 B2 | 8/2004 | Ito et al. | |
| 6,785,241 B1 | 8/2004 | Lu et al. | |
| 6,807,181 B1 | 10/2004 | Weschler | |
| 6,816,750 B1 | 11/2004 | Klaas | |
| 6,859,435 B1 | 2/2005 | Lee et al. | |
| 6,865,155 B1 * | 3/2005 | Wong et al. | 370/235 |
| 6,865,157 B1 | 3/2005 | Scott et al. | |
| 6,888,831 B1 | 5/2005 | Hospodor et al. | |
| 6,901,072 B1 | 5/2005 | Wong | |
| 6,904,507 B2 | 6/2005 | Gil | |
| 6,922,408 B2 | 7/2005 | Bloch et al. | |
| 6,928,470 B1 | 8/2005 | Hamlin | |
| 6,934,799 B2 | 8/2005 | Acharya et al. | |
| 6,941,357 B2 | 9/2005 | Nguyen et al. | |
| 6,941,482 B2 | 9/2005 | Strong | |
| 6,947,393 B2 * | 9/2005 | Hooper, III | 370/258 |
| 6,952,659 B2 | 10/2005 | King et al. | |
| 6,968,463 B2 | 11/2005 | Pherson et al. | |
| 6,975,627 B1 | 12/2005 | Parry et al. | |

| Patent/Publication | Date | Inventor |
|---|---|---|
| 6,987,768 B1 | 1/2006 | Kojima et al. |
| 6,988,130 B2 | 1/2006 | Blumenau et al. |
| 6,988,149 B2 | 1/2006 | Odenwald |
| 7,000,025 B1 | 2/2006 | Wilson |
| 7,002,926 B1 | 2/2006 | Eneboe et al. |
| 7,010,607 B1 | 3/2006 | Bunton |
| 7,024,410 B2 | 4/2006 | Ito et al. |
| 7,031,615 B2 | 4/2006 | Genrile |
| 7,039,070 B2 | 5/2006 | Kawakatsu |
| 7,039,870 B2 | 5/2006 | Takaoka et al. |
| 7,047,326 B1 * | 5/2006 | Crosbie et al. ............. 710/16 |
| 7,050,392 B2 | 5/2006 | Valdevit |
| 7,051,182 B2 | 5/2006 | Blumenau et al. |
| 7,055,068 B2 | 5/2006 | Riedl |
| 7,061,871 B2 | 6/2006 | Sheldon et al. |
| 7,076,569 B1 | 7/2006 | Bailey et al. |
| 7,092,374 B1 | 8/2006 | Gubbi |
| 7,110,394 B1 | 9/2006 | Chamdani et al. |
| 7,120,728 B2 | 10/2006 | Krakirian et al. |
| 7,124,169 B2 | 10/2006 | Shimozono et al. |
| 7,150,021 B1 | 12/2006 | Vajjhala et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,187,688 B2 | 3/2007 | Garmire et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,200,610 B1 * | 4/2007 | Prawdiuk et al. ......... 707/104.1 |
| 7,209,478 B2 | 4/2007 | Rojas et al. |
| 7,215,680 B2 | 5/2007 | Mullendore et al. |
| 7,221,650 B1 | 5/2007 | Cooper et al. |
| 7,230,929 B2 | 6/2007 | Betker et al. |
| 7,233,985 B2 | 6/2007 | Hahn et al. |
| 7,245,613 B1 | 7/2007 | Winkles et al. |
| 7,248,580 B2 | 7/2007 | George et al. |
| 7,263,593 B2 | 8/2007 | Honda et al. |
| 7,266,286 B2 | 9/2007 | Tanizawa et al. |
| 7,269,131 B2 | 9/2007 | Cashman et al. |
| 7,269,168 B2 | 9/2007 | Roy et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,327,680 B1 | 2/2008 | Kloth |
| 7,346,707 B1 | 3/2008 | Erimli |
| 7,352,740 B2 | 4/2008 | Hammons et al. |
| 7,397,788 B2 | 7/2008 | Mies et al. |
| 7,406,034 B1 | 7/2008 | Cometto et al. |
| 7,471,691 B2 * | 12/2008 | Black et al. ............. 370/403 |
| 2001/0011357 A1 | 8/2001 | Mori |
| 2001/0033552 A1 | 10/2001 | Barrack et al. |
| 2001/0038628 A1 | 11/2001 | Ofek et al. ............. 370/392 |
| 2001/0043564 A1 | 11/2001 | Bloch et al. |
| 2002/0016838 A1 | 2/2002 | Geluc et al. |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0118692 A1 | 8/2002 | Oberman et al. |
| 2002/0122428 A1 | 9/2002 | Fan et al. |
| 2002/0124124 A1 | 9/2002 | Matsumoto et al. |
| 2002/0147560 A1 | 10/2002 | Devins et al. |
| 2002/0147843 A1 * | 10/2002 | Rao ............. 709/245 |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 * | 11/2002 | Schimke et al. ............. 709/220 |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002516 A1 | 1/2003 | Boock et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0033487 A1 | 2/2003 | Pfister et al. |
| 2003/0035433 A1 | 2/2003 | Craddock et al. |
| 2003/0046396 A1 | 3/2003 | Richter et al. |
| 2003/0056000 A1 | 3/2003 | Mullendore et al. |
| 2003/0063567 A1 | 4/2003 | Dehart |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 * | 5/2003 | Yao et al. ............. 710/300 |
| 2003/0086377 A1 | 5/2003 | Berman |
| 2003/0091062 A1 | 5/2003 | Lay et al. |
| 2003/0093607 A1 | 5/2003 | Main et al. |
| 2003/0103451 A1 | 6/2003 | Lutgen et al. |
| 2003/0112819 A1 | 6/2003 | Kofoed et al. |
| 2003/0115355 A1 * | 6/2003 | Cometto et al. ............. 709/234 |
| 2003/0117961 A1 | 6/2003 | Chuah et al. |
| 2003/0118053 A1 | 6/2003 | Edsall et al. |
| 2003/0120743 A1 | 6/2003 | Coatney et al. |
| 2003/0120791 A1 | 6/2003 | Weber et al. |
| 2003/0120983 A1 | 6/2003 | Vieregge et al. |
| 2003/0126223 A1 | 7/2003 | Jenne et al. |
| 2003/0126242 A1 | 7/2003 | Chang |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............. 370/389 |
| 2003/0179755 A1 * | 9/2003 | Fraser ............. 370/395.42 |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0198238 A1 | 10/2003 | Westby |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Bryn |
| 2004/0028038 A1 | 2/2004 | Anderson et al. |
| 2004/0054776 A1 | 3/2004 | Klotz et al. |
| 2004/0054866 A1 | 3/2004 | Blumenau et al. |
| 2004/0057389 A1 | 3/2004 | Klotz et al. |
| 2004/0064664 A1 | 4/2004 | Gil |
| 2004/0081186 A1 | 4/2004 | Warren et al. |
| 2004/0081196 A1 | 4/2004 | Elliott |
| 2004/0081394 A1 | 4/2004 | Biren et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141518 A1 | 7/2004 | Milligan et al. |
| 2004/0141521 A1 | 7/2004 | George ............. 370/463 |
| 2004/0151188 A1 | 8/2004 | Maveli et al. |
| 2004/0153526 A1 | 8/2004 | Haun et al. |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |

| | | |
|---|---|---|
| 2004/0218531 A1* | 11/2004 | Cherian et al. ............... 370/235 |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0108444 A1 | 5/2005 | Flauaus et al. |
| 2005/0111845 A1 | 5/2005 | Nelson et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0143300 A1 | 6/2006 | See et al. |
| 2006/0184711 A1 | 8/2006 | Pettey |
| 2006/0203725 A1 | 9/2006 | Paul et al. |
| 2006/0274744 A1 | 12/2006 | Nagai et al. |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |

OTHER PUBLICATIONS

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

Curtis, A. R., "Design Considerations for 10-Gbit Fibre Channel", Curtis A. Ridgeway, Distinguished I/O Architect, Storage and Computing ASIC's Division, LSI Logic Corp..

Malavalli, Kumar , "High Speed Fibre Channel Switching Fabric Devices", Proceedings of the SPIE, SPIE, Bellingham, VA, USA vol. 1577., XP000562869, ISSN: 0277-786X,(Sep. 4, 1991),216-226.

Melhem, et al., "Minimizing Wavelength Conversions in WDM Path Establishment", Computer Science Department, University of Pittsburgh, Pittsburgh, PA 15260, (2001),197-211.

Ridgeway, Curt , "0GFC-40GFC using 4-lane XAUI's", LSI Logic Presentation—T11/03-069v0.

Banks, David C., et al., "Link Trunking and Measuring Link Latency in Fibre Channel Fabric", U.S. Appl. No. 60/286,046, 1-52.

U.S. Appl. No. 10/266,360, filed Oct. 7, 2002, Method And System For Reducing Congestion In Computer Networks.

U.S. Appl. No. 10/241,153, filed Sep. 11, 2002, Zone Management In A Multi-Module Fibre Channel Switch.

U.S. Appl. No. 10/263,858, filed Oct. 2002, Method And System For Using Distributed Name Servers In Multi-Module Fibre Channel Switching.

U.S. Appl. No. 10/212,425, filed Aug. 5, 2002, Method And System For Flexible Routing In A Fibre Channel System.

U.S. Appl. No. 10/302,149, filed Nov. 22, 2002, Method And System For Controlling Packet Flow In Networks.

U.S. Appl. No. 10/894,579, filed Jul. 20, 2004, Method And System for Managing Traffic in Fibre Channel Switches.

U.S. Appl. No. 10/894,546, filed Jul. 20, 2004, Method and System for Routing and Filtering Network Data Packets in Fibre Channel Systems.

U.S. Appl. No. 10/894,827, filed Jul. 20, 2004, Method and System for Selecting Virtual Lanes in Fibre Channel Switches.

U.S. Appl. No. 10/894,597, filed Jul. 20, 2004, Programmable Pseudo Virtual Lanes for Fibre Channel Systems.

U.S. Appl. No. 10/894,595, filed Jul. 20, 2004, Method and System for Reducing Latency and Congestion in Fibre Channel Switches.

U.S. Appl. No. 10/664,548, filed Sep. 19, 2003, Buffer to Buffer Credit Recovery for In-Line Fibre Channel Credit Extension Devices.

U.S. Appl. No. 10/895,175, filed Jul. 20, 2004, Method and System for Detecting Congestion and Over Subscription in a Fibre Channel Network.

U.S. Appl. No. 10/894,492, filed Jul. 20, 2004, LUN Based Hard Zoning in Fibre Channel Switches.

U.S. Appl. No. 10/894,587, filed Jul. 20, 2004, Multi Speed Cut Through Operation in Fibre Channel Switches.

U.S. Appl. No. 10/894,726, filed Jul. 20, 2004, Method and System for Improving Bandwidth & Reducing Idles in Fibre Channel Switches.

U.S. Appl. No. 10/894,629, filed Jul. 20, 2004, Method and System for Routing Fibre Channel Systems.

U.S. Appl. No. 10/894,491, filed Jul. 20, 2004, Method and System for Keeping a Fibre Channel Arbitrated Loop Open During Frame Gaps.

U.S. Appl. No. 10/894,536, filed Jul. 20, 2004, Method And System For Congestion Control Based On Optimum Bandwidth Allocation In A Fibre Channel Switch.

U.S. Appl. No. 10/894,627, filed Jul. 20, 2004, Method and System for Programmable Data Dependent Network Routing.

U.S. Appl. No. 10/719,077, filed Nov. 21, 2003, Method and System for Monitoring Events in Storage Area Networks.

U.S. Appl. No. 10/894,689, filed Jul. 20, 2004, Method and System for Power Control of Fibre Channel Switches.

U.S. Appl. No. 10/798,527, filed Mar. 11, 2004, Method and System for Preventing Deadlock in Fibre Channel Fabrics using Frame Priorities.

U.S. Appl. No. 10/798,468, filed Mar. 11, 2004, Method and System for Reducing Deadlock in Fibre Channel Fabrics using Virtual Lanes.

U.S. Appl. No. 10/894,586, filed Jul. 20, 2004, Method and System for Buffer to Buffer Credit recovery in Fibre Channel Systems Using Virtual and/or Pseudo Virtual Lane.

U.S. Appl. No. 10/889,337, filed Jul. 12, 2004, Method And System For Minimizing Disruption In Common-Access Networks.

U.S. Appl. No. 10/889,259, filed Jul. 12, 2004, Method And Apparatus For Detecting And Removing Orphaned Primitives In A Fibre Channel Network.

U.S. Appl. No. 10/889,267, filed Jul. 12, 2004, Method And System For Fibre Channel Arbitrated Loop Acceleration.

U.S. Appl. No. 10/889,551, filed Jul. 12, 2004, Method And Apparatus For Testing Loop Pathway Integrity In A Fibre Channel Arbitrated Loop.

U.S. Appl. No. 10/889,256, filed Jul. 12, 2004, Method And Apparatus For Accelerating Receive-Modify-Send Frames In A Fibre Channel Network.

U.S. Appl. No. 10/889,255, filed Jul. 12, 2004, Method and Apparatus for Test Pattern Generation.

U.S. Appl. No. 10/889,588, filed Jul. 12, 2004, Method And Apparatus For Improving Buffer Utilization In Communication Networks.

U.S. Appl. No. 10/894,597, filed Jul. 20, 2004, Method And System For Using Extended Fabric Features With Fibre Channel Switch Elements.

U.S. Appl. No. 10/894,978, filed Jul. 20, 2004, Method And System for Programmable Data Dependent.

U.S. Appl. No. 10/894,917, filed Jul. 20, 2004, Method and System for Configuring Fibre Channel Ports.

U.S. Appl. No. 10/894,529, filed Jul. 20, 2004, Integrated Fibre Channel Fabric Controller.

U.S. Appl. No. 10/894,732, filed Jul. 20, 2004, Method And System For Congestion Control In A Fibre Channel Switch.

U.S. Appl. No. 10/957,465, filed Oct. 1, 2004, Method and System for Using Boot Servers in Fibre Channel Network Routing.

U.S. Appl. No. 10/956,717, filed Oct. 1, 2004, Method and System for Transferring Data directly between storage devices in a Storage Area Networks.

U.S. Appl. No. 10/956,501, filed Oct. 1, 2004, High Speed Fibre Channel Switch Elements.

U.S. Appl. No. 10/956,502, filed Oct. 1, 2004, Method and System for LUN Remapping in Fibre Channel Networks.

U.S. Appl. No. 10/961,463, filed Oct. 8, 2004, Fibre Channel Transparent Switch For Mixed Switch Fabrics.

U.S. Appl. No. 10/956,718, filed Oct. 1, 2004, Method and System for Using an In-Line Credit Extender with a Host Bus Adapter.

"Office Action from USPTO dated Mar. 5, 2008 for U.S. Appl. No. 10/889,259".

"Office Action from USPTO dated Mar. 7, 2008 for U.S. Appl. No. 10/894,629".

"Notice of Allowance from USPTO dated Jan. 8, 2008 for U.S. Appl. No. 10/889,551".

"Notice of Allowance from USPTO dated Feb. 8, 2008 for U.S. Appl. No. 10/894,529".

"Office Action from USPTO dated Jan. 9, 2008 for U.S. Appl. No. 10/798,468".

"Office Action from USPTO dated Jan. 9, 2008 for U.S. Appl. No. 11/608,634".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Office Action from USPTO dated Mar. 20, 2008 for U.S. Appl. No. 10/894,732".

"Examination Report from the European Patent Office dated Oct. 12, 2007 for European Application No. 05 805 632.6".

"Office Action from USPTO dated Oct. 18, 2006 for U.S. Appl. No. 10/241,153".

"Office Action from USPTO dated Apr. 6, 2007 for U.S. Appl. No. 10/956,718".

"Office Action from USPTO dated Oct. 3, 2007 for U.S. Appl. No. 10/956,717".

"Office Action from USPTO dated Jun. 1, 2007 for U.S. Appl. No. 10/961,463".

Malavalli, et al., "Fibre Channel Framing and Signaling (FC-FS) REV 1.10", *NCITS working draft proposed American National Standard for Information Technology*, (Jan. 25, 2001).

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated May 21, 2007 for U.S. Appl. No. 10/212,425".

"Office Action from USPTO dated Sep. 6, 2007 for U.S. Appl. No. 10/889,337".

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Office Action from USPTO dated Apr. 3, 2007 for U.S. Appl. No. 10/241,153".

"Office Action from USPTO dated Nov. 16, 2007 for U.S. Appl. No. 10/241,153".

"Office Action from USPTO dated Nov. 15, 2006 for U.S. Appl. No. 10/263,858".

"Office Action from USPTO dated Jul. 11, 2007 for U.S. Appl. No. 10/263,858".

"Office Action from USPTO dated Jan. 19, 2007 for U.S. Appl. No. 10/302,149".

"Office Action from USPTO dated Aug. 20, 2007 for U.S. Appl. No. 10/302,149".

"Office Action from USPTO dated Jul. 3, 2007 2007 for U.S. Appl. No. 10/664,548".

"Office Action from USPTO dated Sep. 20, 2007 for U.S. Appl. No. 10/798,527".

"Office Action from USPTO dated Sep. 20, 2007 for U.S. Appl. No. 10/889,267".

"Office Action from USPTO dated Mar. 21, 2006 for U.S. Appl. No. 10/889,588".

"Office Action from USPTO dated Sep. 10, 2007 for U.S. Appl. No. 10/889,255".

"Office Action from USPTO dated Sep. 4, 2007 for U.S. Appl. No. 10/889,551".

"Office Action from USPTO dated Sep. 20, 2007 for U.S. Appl. No. 10/889,259".

"Office Action from USPTO dated Sep. 19, 2007 for U.S. Appl. No. 10/894,492".

"Office Action from USPTO dated Oct. 4, 2007 for U.S. Appl. No. 10/894,627".

"Office Action from USPTO dated Oct. 25, 2007 for U.S. Appl. No. 10/894,491".

"Office Action from USPTO dated Oct. 23, 2007 for U.S. Appl. No. 10/894,597".

"Office Action from USPTO dated Oct. 25, 2007 for U.S. Appl. No. 10/894,579".

"Office Action from USPTO dated Oct. 11, 2007 for U.S. Appl. No. 10/894,629".

"Office Action from USPTO dated Oct. 25, 2007 for U.S. Appl. No. 10/894,536".

"Office Action from USPTO dated Nov. 13, 2007 for U.S. Appl. No. 10/894,586".

"Office Action from USPTO dated Oct. 17, 2007 for U.S. Appl. No. 10/894,917".

"Office Action from USPTO dated Jun. 28, 2007 for U.S. Appl. No. 10/894,529".

"Office Action from USPTO dated Sep. 14, 2007 for U.S. Appl. No. 10/894,978".

"Office Action from USPTO dated Apr. 4, 2008 for U.S. Appl. No. 10/957,465".

"Notice of Allowance from USPTO dated Apr. 10, 2008 for U.S. Appl. No. 10/241,153".

"Office Action from USPTO dated Apr. 11, 2008 for U.S. Appl. No. 10/894,595".

"Office Action from USPTO dated Apr. 14, 2008 for U.S. Appl. No. 10/894,627".

"Office Action from USPTO dated Apr. 17, 2008 for U.S. Appl. No. 10/894,689".

"Notice of Allowance from USPTO dated Apr. 18, 2008 for U.S. Appl. No. 10/894,597".

"Final Office Action from USPTO dated Apr. 23, 2008 for U.S. Appl. No. 10/889,255".

"Final Office Action from USPTO dated Apr. 25, 2008 for U.S. Appl. No. 10/894,579".

"Final Office Action from USPTO dated Apr. 1, 2008 for U.S. Appl. No. 10/956,717".

"Office Action from USPTO dated Apr. 3, 2008 for U.S. Appl. No. 10/894,587".

"Notice of Allowance from USPTO dated Apr. 4, 2008 for U.S. Appl. No. 11/608,634".

"Final Office Action from USPTO dated Jun. 4, 2008 for U.S. Appl. No. 10/894,978".

"Final Office Action from USPTO dated Jun. 5, 2008 for U.S. Appl. No. 10/889,267".

"Final Office Action from USPTO dated Jun. 10, 2008 for U.S. Appl. No. 10/894,586".

"Office Action from USPTO dated Jun. 25, 2008 for U.S. Appl. No. 10/895,175".

"Notice of Allowance from USPTO dated Jun. 25, 2008 for U.S. Appl. No. 10/894,491".

"Notice of Allowance from USPTO dated Jun. 27, 2008 for U.S. Appl. No. 10/956,717".

"Office Action from USPTO dated Jun. 26, 2008 for U.S. Appl. No. 10/894,547".

"Office Action from USPTO dated Jun. 27, 2008 for U.S. Appl. No. 10/894,726".

"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
"Office Action from USPTO dated Sep. 18, 2008 for U.S. Appl. No. 10/894,978".
"Office Action from USPTO dated Sep. 23, 2008 for U.S. Appl. No. 12/031,585".
"Notice of Allowance from USPTO dated Sep. 29, 2008 for U.S. Appl. No. 10/889,267".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 24, 2008 for U.S. Appl. No. 10/894,726".
"Office Action from USPTO dated Dec. 23, 2008 for U.S. Appl. No. 10/798,468".
"Notice of Allowance from USPTO dated Dec. 30, 2008 for U.S. Appl. No. 11/037,922".
"Office Action from USPTO dated May 15, 2008 for U.S. Appl. No. 10/798,527".
"Final Office Action from USPTO dated Apr. 29, 2008 for U.S. Appl. No. 10/894,491".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 2, 2008 for U.S. Appl. No. 11/037,922".

* cited by examiner

METHOD AND SYSTEM FOR NON-DISRUPTIVE DATA CAPTURE IN NETWORKS

CROSS-REFERENCE TO RELATED APPLICATIONS

This application claims priority under 35 USC Section 119(e), to the following provisional patent applications:
Ser. No. 60/487,876 filed on Jul. 16, 2003;
Ser. No. 60/487,887 filed on Jul. 16, 2003;
Ser. No. 60/487,875 filed on Jul. 16, 2003;
Ser. No. 60/490,747 filed on Jul. 29, 2003;
Ser. No. 60/487,667 filed on Jul. 16, 2003;
Ser. No. 60/487,665 filed on Jul. 16, 2003;
Ser. No. 60/492,346 filed on Aug. 4, 2003; and
Ser. No. 60/487,873 filed on Jul. 16, 2003.

The disclosures of the foregoing applications are incorporated herein by reference in their entirety.

BACKGROUND

1. Field of the Invention

The present invention relates to networks, and more particularly to non-disruptive data capture.

2. Background of the Invention

Data-capture in a communications network typically requires dedicated and specialized equipment, and is not incorporated in a port attached to the communications network. Specialized data-capture equipment typically has abundant buffer space for the data-capture and can keep pace with all traffic in a communications network. However, many classes of problems—such as network and topology discovery, automated configuration, and intelligent device diagnostics—require data-capture but do not require keeping pace with the communications network itself.

Various protocols are used for networks. Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop, and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

FC-AL is one fibre channel standard (incorporated herein by reference in its entirety) that establishes the protocols for an arbitrated loop topology. In an AL loop (per the FC-AL fibre channel standard) various devices can send data to each other. An arbitration cycle (using the "ARB" primitive) determines which device gets access. The priority scheme itself is defined by the standard. A device (e.g. device A) seeking access to another device (device B) sends an ARB primitive. If device A wins arbitration then it sends an OPN primitive and establishes a connection with device B. Device B sends an R_RDY primitive indicating that credit is available for a frame. Thereafter, frames are transferred.

Each port has a loop port state machine ("LPSM") and in conventional implementation, the LPSM must be at a certain state to send or receive data.

Unlike a traditional communications port, a Data-Capture port may receive data outside of typical network-specific hand shaking. For example, in a FC-AL topology, a traditional port may receive data only if the LPSM is in one of several specific states and only if sufficient Buffer-to-Buffer Credit is available, but a Data-Capture port may receive data regardless of these conditions. A Data-Capture port may also receive data destined for another port. Data-Capture ports copy data from a network, but do not follow network hand shaking, and do not participate as a traditional communications port.

In order to capture all data based on specific criteria, Data-Capture ports include a large set of buffers, which are typically expensive, and are separate from a traditional communications port.

FIG. 2 shows an example of a traditional implementation (200) of a traditional port and a data capture port. State machines 201 and 203 operate with limited buffers 206 and 205 respectively. Port 202 includes a data capture state machine and uses a large set of buffers 204. This makes the use of data capture ports very expensive in commercial products.

Therefore, what is required is a process and system that allows data capture function without using expensive buffers.

SUMMARY OF THE INVENTION

In one aspect of the present invention, a method for capturing data in a fibre channel system is provided. The method includes, detecting a condition for enabling data capture; setting a control bit to enable data capture; and capturing data based on the set control bit. Incoming data is sampled to determine what levels of data capture may be required and if the data is from a private or public loop. A communication port is configured to capture data.

In another aspect of the present invention, a fibre channel switch element is provided. The switch element includes, a diagnostic port that can be configured as a traditional communication port and/or a data capture port depending on incoming frame data. The diagnostic port filters incoming frames, which is used to enable data capture.

In yet another aspect of the present invention, a data capture port is integrated with a traditional communication port and hence operates as a communication/data capture port. Also, due to intelligent frame filtering, a large set of buffers is not always needed for data capture and hence this reduces the overall cost of the system.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"AL_PA": Arbitrated loop physical address.

"FC-AL": Fibre channel arbitrated loop process described in FC-AL standard.

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols "LIP": Loop initialization protocol primitive.

"L_Port": A port that contains Arbitrated Loop functions associated with the Arbitrated Loop topology.

"S_ID": Source address field in a fibre channel frame header.

"SES": SCSI Enclosure Services.

"TPE": Transmission Protocol Engine, a controller that operates at the FC-1 level.

To facilitate an understanding of the preferred embodiment, the general architecture and operation of a fibre channel system will be described. The specific architecture and operation of the preferred embodiment will then be described with reference to the general architecture of the fibre channel system.

Figure 1:
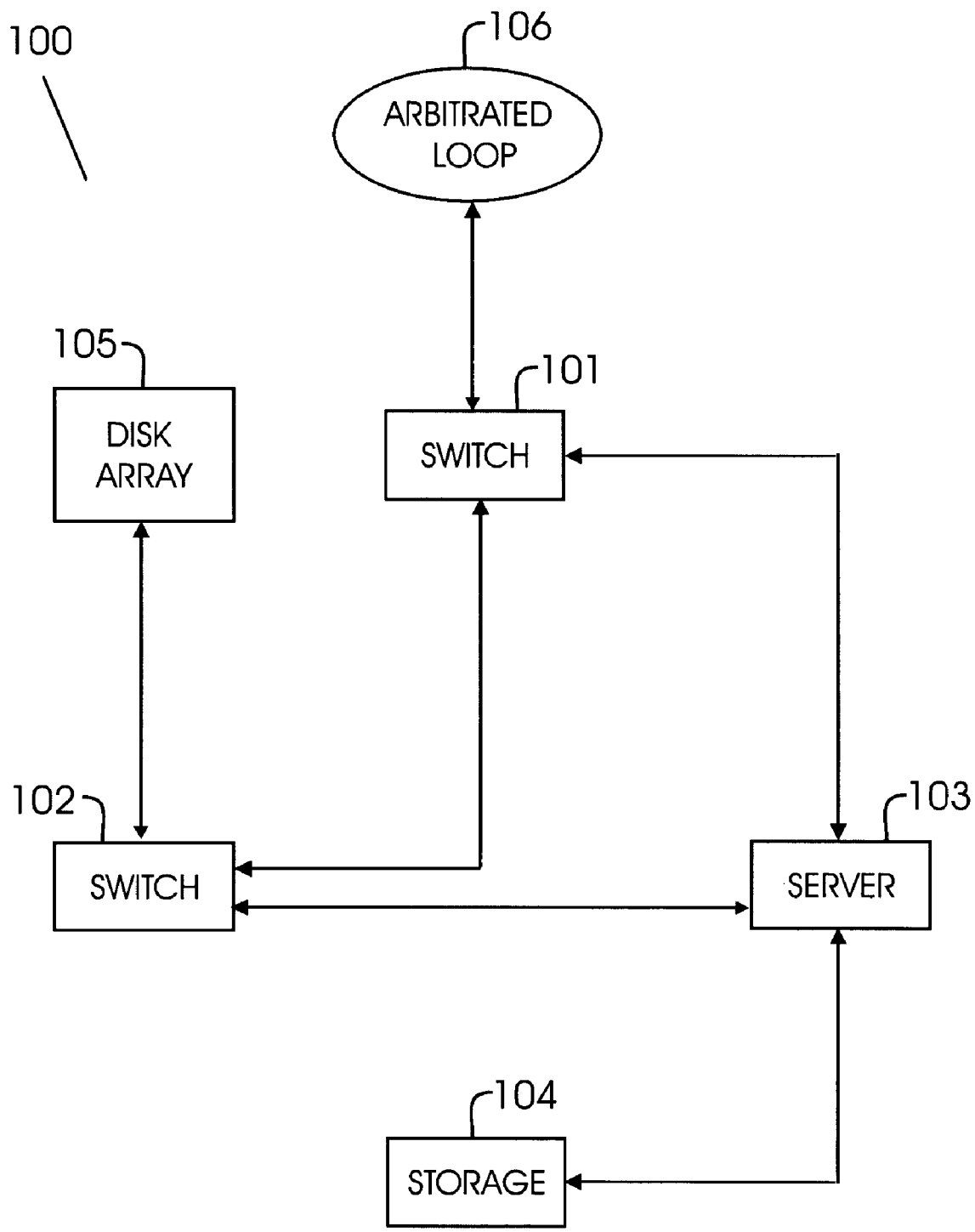
FIG. 1 shows a block diagram of a storage area network.
Figure 2:
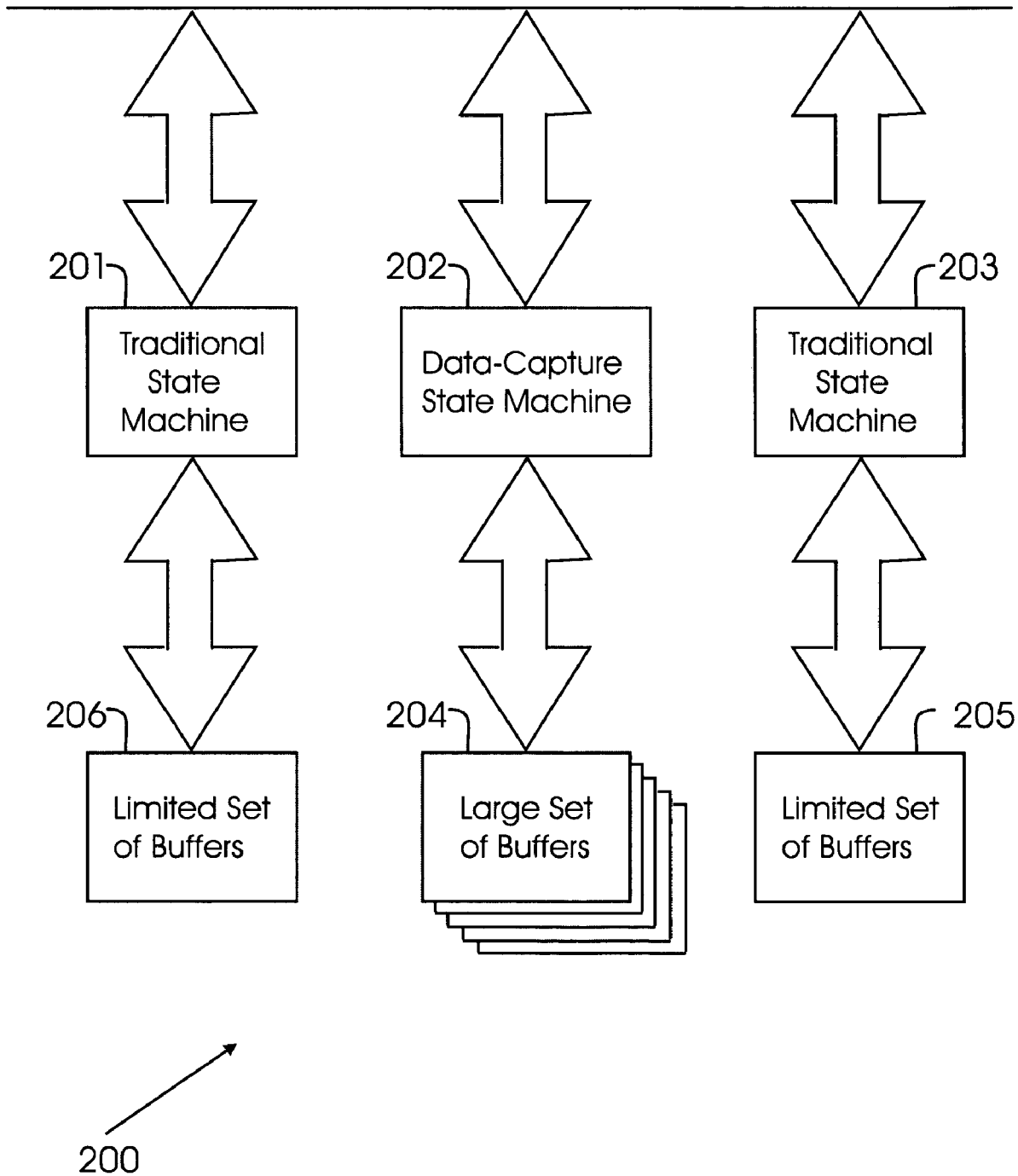
FIG. 2 shows a prior art data capture port.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Figure 3:
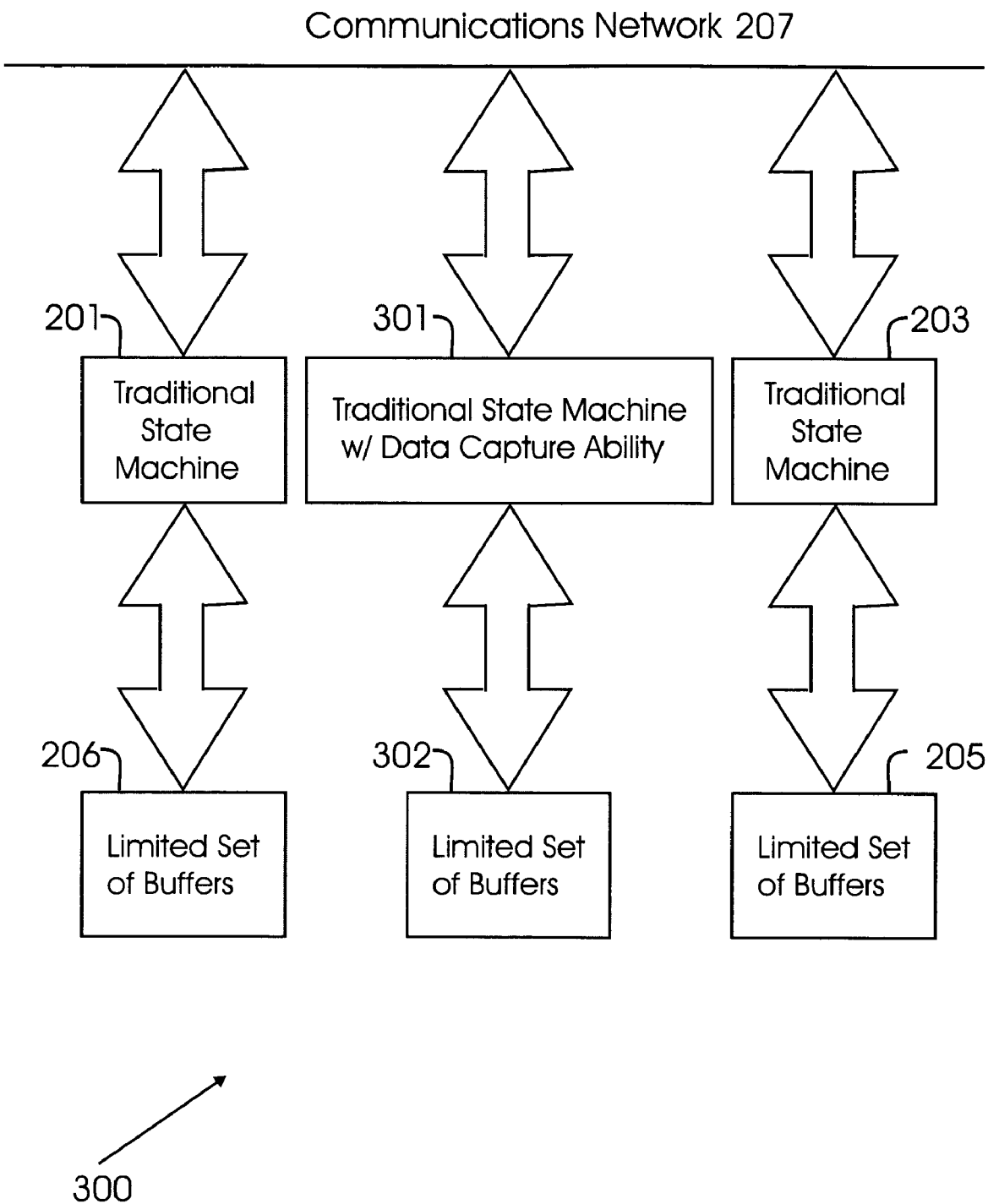
FIG. 3 shows a block diagram of using a traditional state machine with a data capture port, according to one aspect of the present invention.

FIG. 3 shows a block diagram of the top-level architecture to one aspect of the current invention. FIG. 3 shows a system 300 where a traditional state machine 301 is used with data capture capability with limited set of buffers 302. By incorporating data-capture into a traditional communications port, this port may not only detect more conditions on the communications network, but also provide more solutions by participating as a traditional port. When data-capture is not required, the integrated port is used as a traditional network port.

The ability to use a traditional port for data capturing will now be described with respect to the block diagram of FIG. 4.

Figure 4:
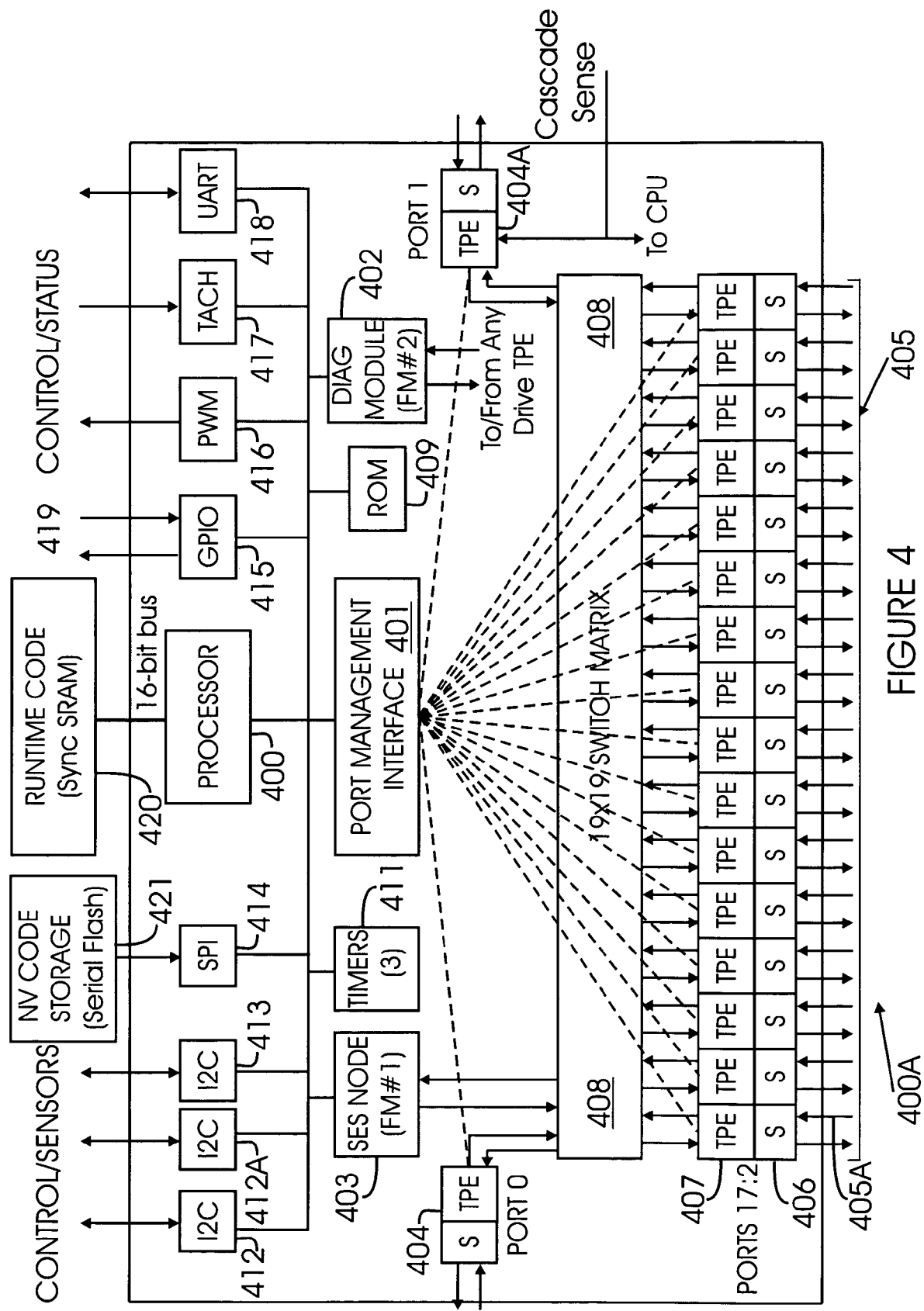
FIG. 4 shows a block diagram of a switch element, according to one aspect of the present invention.

FIG. 4 is a block diagram of an 18-port ASIC FC element 400A (also referred to as system 400A) according to one aspect of the present invention. FC element 400A provides various functionality in an FC-AL environment, including without limitation, FC element 400A operates as a loop controller and loop switch using switch matrix 408, in accordance with the FC-AL standard.

FC element 400A of the present invention is presently implemented as a single CMOS ASIC, and for this reason the term "FC element" and ASIC are used interchangeably to refer to the preferred embodiments in this specification. Although FIG. 4 shows 18 ports, the present invention is not limited to any particular number of ports.

System 400A provides a set of port control functions, status indications, and statistics counters for monitoring the health of the loop and attached devices, diagnosing faults, and recovering from errors.

ASIC 400A has 18 ports where 16 ports are shown as numeral 405 while a host port 404 and cascade port 404A are shown separately for convenience only. These ports are generic to common Fibre Channel port types, for example, L_Ports.

For illustration purposes only, all ports are drawn on the same side of ASIC 400A in FIG. 4. However, the ports may be located on any side of ASIC 400A. This does not imply any difference in port or ASIC design. Actual physical layout of the ports will depend on the physical layout of the ASIC.

Each port has transmit and receive connections to switch matrix 408 and includes transmit protocol engine 407 and a serial/deserializer 406. Frames enter/leave the link 405A and SERDES 406 converts data into 10-bit parallel data to fibre channel characters.

Switch matrix 408 dynamically establishes a connection for loop traffic. Switch matrix 408 includes a global arbiter (hence switch matrix 408 is also referred to as SGA 408) that provides lower latency and improved diagnostic capabilities while maintaining full Fibre Channel Arbitrated Loop (FC-AL) compliance.

Switch matrix 408 provides a quasi-direct architecture in the form of a buffer-less Switch Matrix. Switch matrix 408 includes data multiplexers that provide a path to each port.

SGA 408 creates a direct loop connection between source and destination devices. This connection methodology avoids the delay associated with data having to pass from one disk drive member of the loop to the next until the data has completed traversing the loop.

System 400A includes plural I2C (I2C standard compliant interfaces 412-413 (including 412A) that allow system 400A to couple to plural I2C ports each having a master and slave capability.

System 400A also includes a general-purpose input/output interface ("GPIO") 415. This allows information from system 400A to be analyzed by any device that can use GPIO 415. Control/Status information 419 can be sent or received through module 415.

System 400A also includes a SPI module 414 that is used for parallel to serial and serial to parallel transfer between processor 400 firmware and flash memory 421 in the standard Little Endian format.

System 400A also includes a Universal Asynchronous Receiver/Transmitter ("UART") interface 418 that converts serial data to parallel data (for example, from a peripheral device modem or data set) and vice-versa (data received from processor 400) complying industry standard requirements.

System 400A can also process tachometer inputs (received from a fan, not shown) using module 417. Processor 400 can read the tachometer input via a tachometer rate register and status register (not shown).

System 400A provides pulse width modulator ("PWM") outputs via module 416. Processor 400 can program plural outputs. Timer module 411 is provided for maintaining plural timers for various operations.

System 400A also includes two frame manager modules 402 and 403 that are similar in structure. Processor 400 can set both modules 402 and 403 into a data capture mode by using a control bit as described below with respect to FIGS. 7 and 8. Processor 400 can access runtime code from memory 420 and input/output instructions from read only memory "ROM" 409.

Figure 5A:
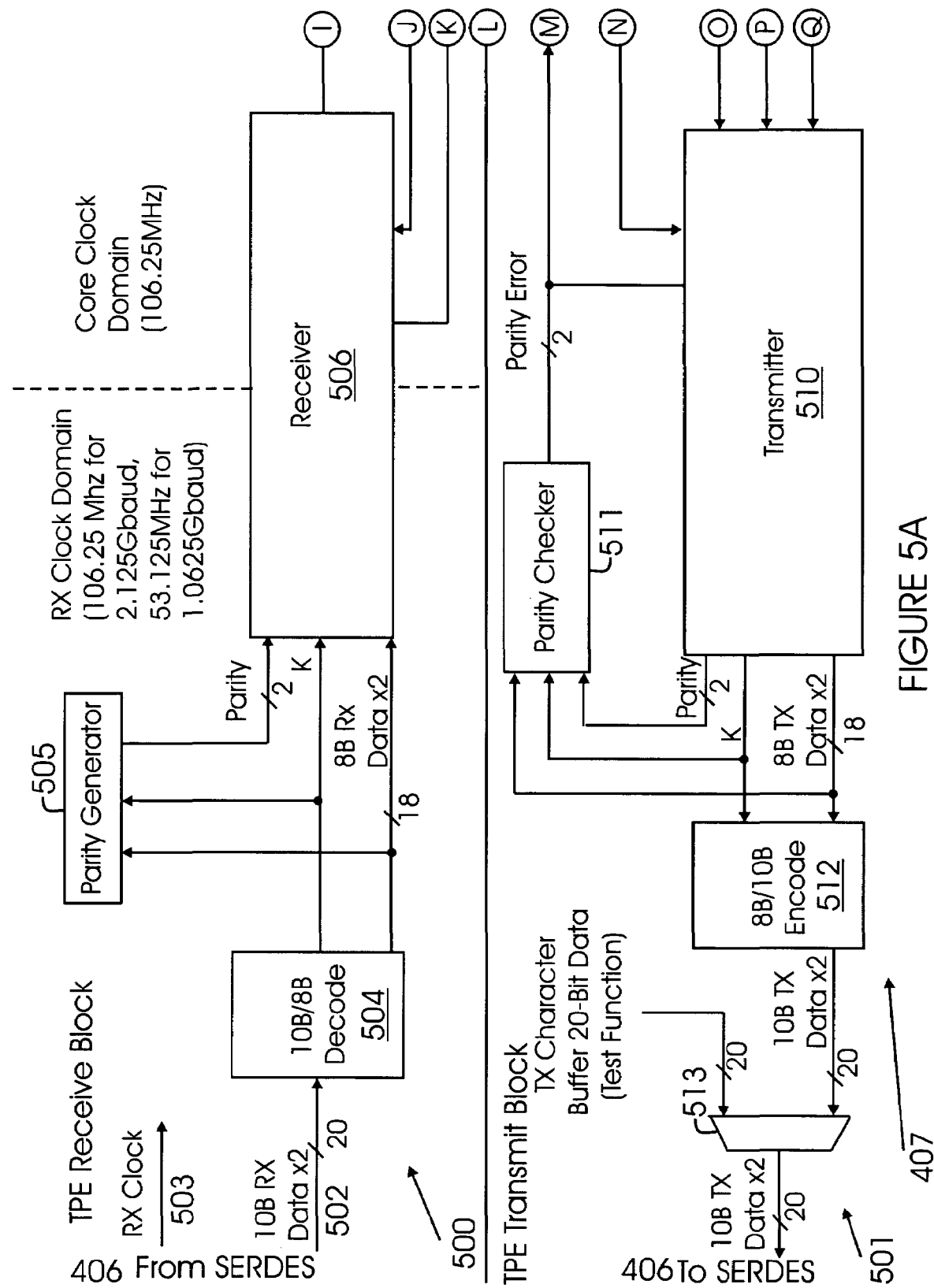
FIGS. 5A and 5B (jointly referred to as FIG. 5) show a block diagram of a transmission protocol engine, according to one aspect of the present invention.
Figure 5B:
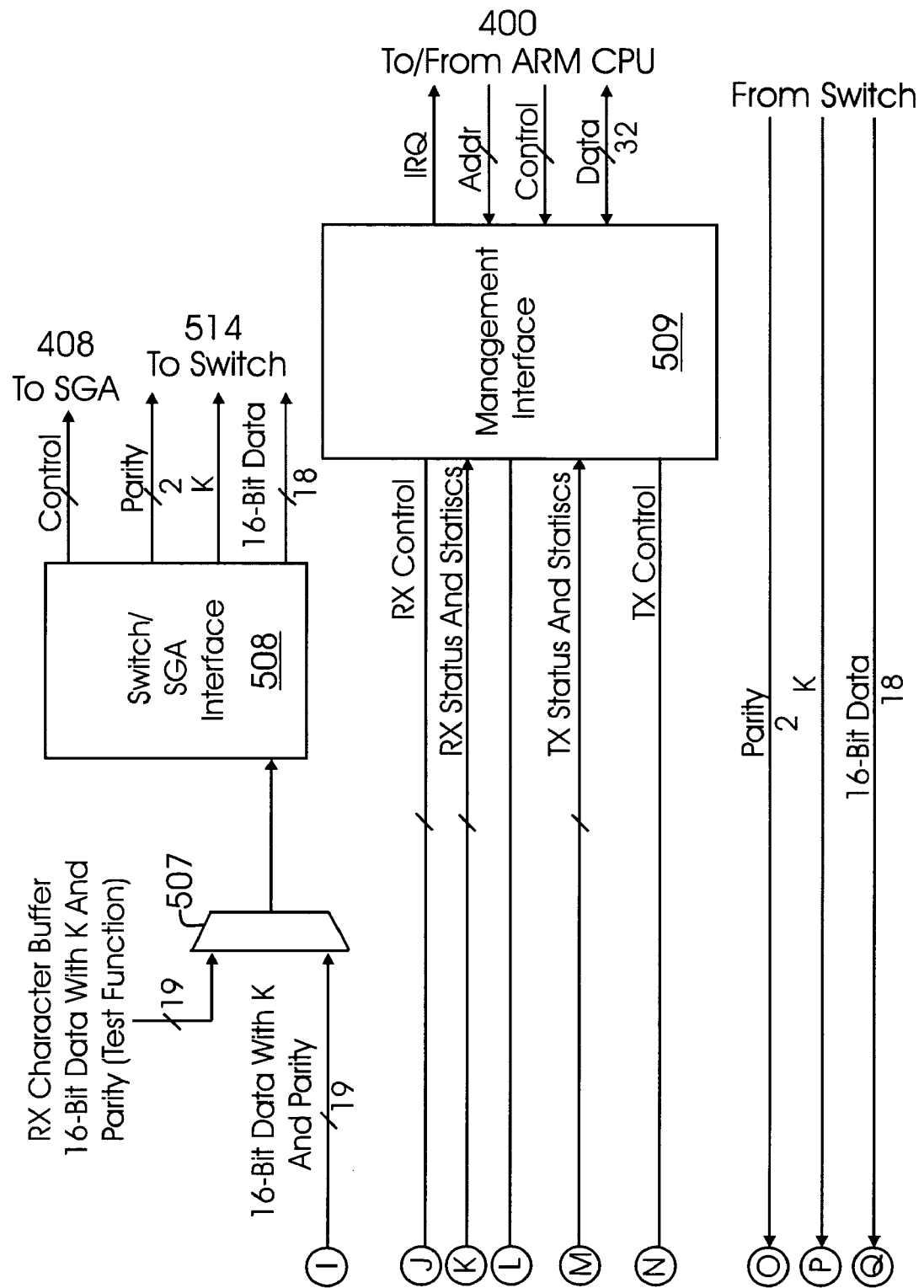

Port Management Interface (PMIF) 401 allows processor 400 access to various port level registers, SerDes modules 406 and TPE Management Interfaces 509 (FIG. 5). PMIF 401 contains a set of global control and status registers, receive and transmit test buffers, and three Serial Control Interface (SCIF) controllers (not shown) for accessing SerDes 406 registers.

Module 402 (also referred to as the "diag module 402") is a diagnostic module used to transfer diagnostic information between a FC-AL and the firmware of system 400A.

Diag module 402 is functionally coupled to storage media (via ports 405) via dedicated paths outside switch matrix 408 so that its connection does not disrupt the overall loop. Diag module 402 is used for AL_PA capture during LIP propagation, drive(s) (coupled to ports 405) diagnostics and frame capture.

Module 403 (also referred to as "SES module 403") complies with the SES standard and is functionally coupled to host port 404 and its output is routed through switch matrix 408. SES module 403 is used for in-band management services using the standard SES protocol.

When not bypassed, modules 402 and 403 receive primitives, primitive sequences, and frames. Based on the received traffic and the requests from firmware, modules 402 and 403 maintain loop port state machine (LPSM) (615, FIG. 6B) in the correct state per the FC-AL standard specification, and also maintains the current fill word.

Based on a current LPSM 615 state (OPEN or OPENED State), modules 402 and 403 receive frames, pass the frame onto a buffer, and alert firmware that a frame has been received. Module 402 and 403 follow FC-AL buffer to buffer credit requirements.

Firmware may request modules 402 and 403 to automatically append SOF and EOF to the outgoing frame, and to automatically calculate the outgoing frame's CRC using CRC generator 612. Modules 402 and 403 can receive any class of frames and firmware may request to send either fibre channel Class 2 or Class 3 frames.

Figure 6A:
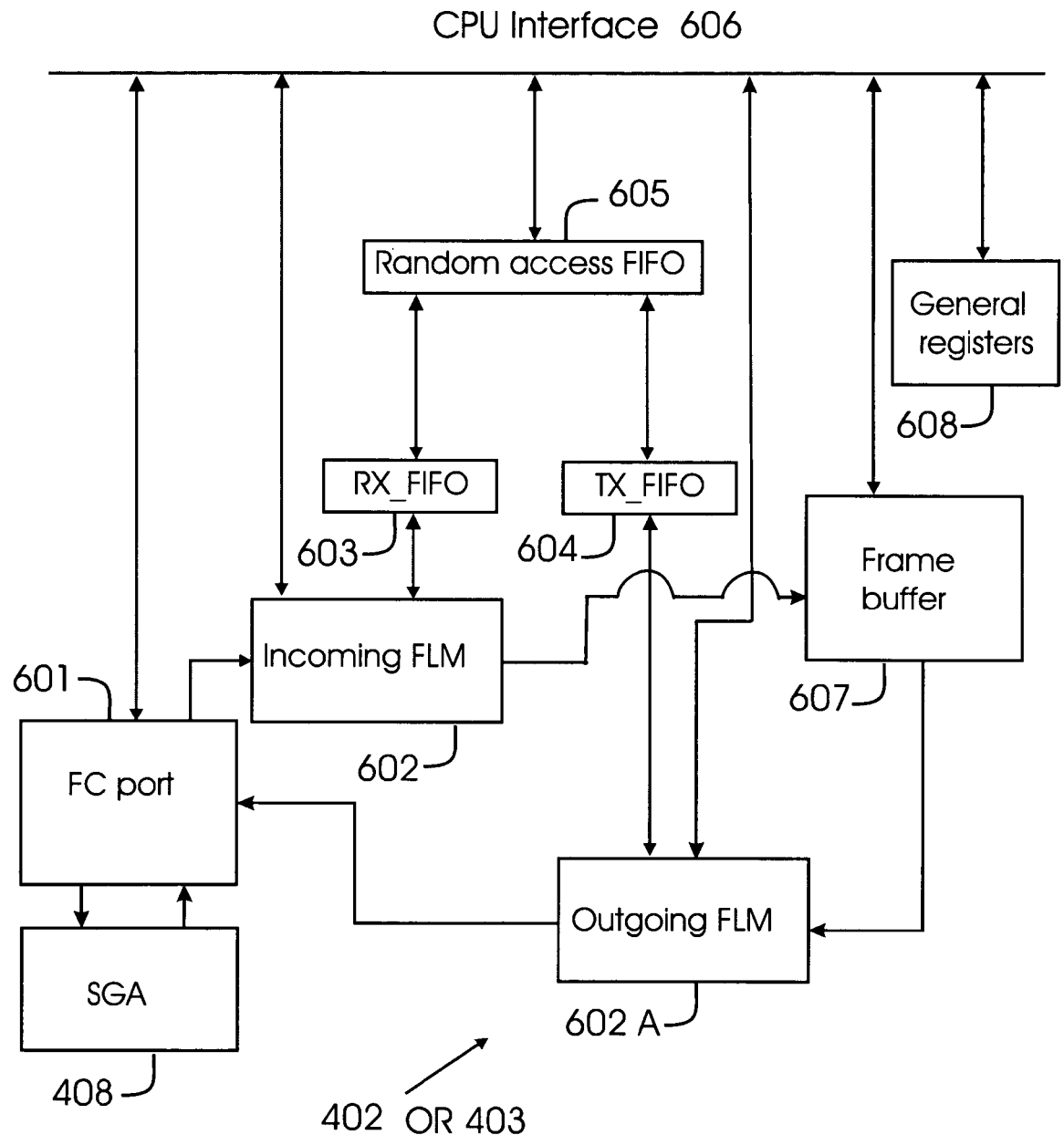
FIGS. 6A and 6B show block diagrams for a diagnostic module and a SES module, according to one aspect of the present invention.
Figure 6B:
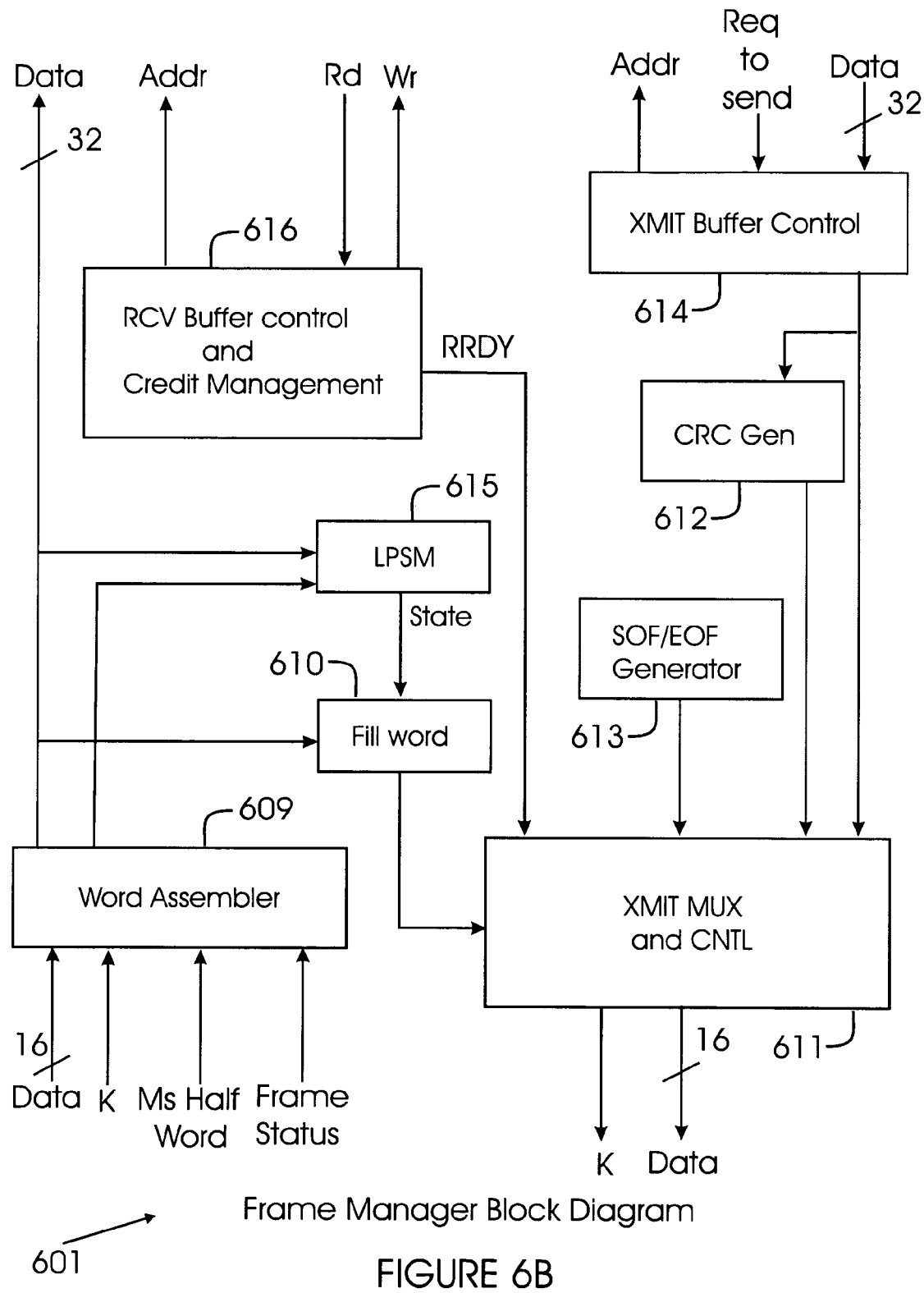

FIGS. 6A and 6B show block diagrams for module 402 and 403. It is noteworthy that the structure in FIGS. 6A and 6B can be used for both modules 402 and 403. FIG. 6B is the internal data path of a FC port 601 coupled to modules 402/403.

Modules 402 and 403 interface with processor 400 via an interface 606. Incoming frames to modules 402 and 403 are received from port 601 (which could be any of the ports 404, 404A and 405) and stored in frame buffer 607. Outgoing frames are also stored in frame buffer 607. Modules 402 and 403 have a receive side memory buffer based on "first-in, first-out" principle, ("FIFO") "RX_FIFO" 603 and transmit side "TX_FIFO" FIFO 604 interfacing with random access FIFO 605. A receive side FIFO 603 signals to firmware when incoming frame(s) are received. A transmit side FIFO 604 signals to hardware when outgoing frames(s) are ready for transmission. A frame buffer 607 is used to stage outgoing frames and to store incoming frames. Modules 602 and 602A are used to manage frame traffic from port 601 to buffers 603 and 604, respectively.

Modules 402 and 403 use various general-purpose registers 608 for managing control, status and timing information.

Based on the AL_PA, modules 402 and 403 monitor received frames and if a frame is received for a particular module (402 or 403), it will pass the frame onto a receive buffer and alert the firmware that a frame has been received via a receive side FIFO 603. Modules 402 and 403 follow the FC-AL buffer-to-buffer credit requirements using module 616. Modules 402 and 403 transmit primitives and frames based on FC-AL rules. On request, modules 402 and 403 may automatically generate start of frame "SOF" and end of frame "EOF" during frame transmission (using module 613). On request, modules 402 and 403 may also automatically calculate the Cyclic Redundancy Code (CRC) during frame transmission, using module 612.

Overall transmission control is performed by module 611 that receives data, SOF, EOF and CRC. A word assembler module 609 is used to assemble incoming words, and a fill word module 610 receives data "words" before sending it to module 611 for transmission. Transmit buffer control is provided by module 614.

FIG. 5 shows a block diagram of the transmission protocol engine ("TPE") 407. TPE 407 maintains plural counters/registers to interact with drives coupled to ports 405. Each TPE 407 interacts with processor 400 via port manager interface "PMIF" 401.

Each Fibre Channel port of system 400A includes a TPE module for interfacing with SerDes 406. TPE 407 handles most of the FC-1 layer (transmission protocol) functions, including 10B receive character alignment, 8B/10B encode/decode, 32-bit receive word synchronization, and elasticity buffer management for word re-timing and TX/RX frequency compensation.

SerDes modules 406 handle the FC-1 serialization and de-serialization functions. Each SerDes 406 port consists of an independent transmit and receive node.

TPE 407 has a receive module 500 (that operates in the Rx clock domain 503) and a transmit module 501. Data 502 is received from SERDES 406 and decoded by decoding module 504. A parity generator module 505 generates parity data. SGA interface 508 allows TPE to communicate with switch 514 or switch matrix 408. Interface 508 (via multiplexer 507)

receives information from a receiver module 506 that receives decoded data from decode module 504 and parity data from module 505.

Management interfaces module 509 interfaces with processor 400. Transmit module 501 includes a parity checker 511, a transmitter 510 and an encoder 512 that encodes 8-bit data into 10-bit data. 10-bit transmit data is sent to SERDES 406 via multiplexer 513.

Figure 7:
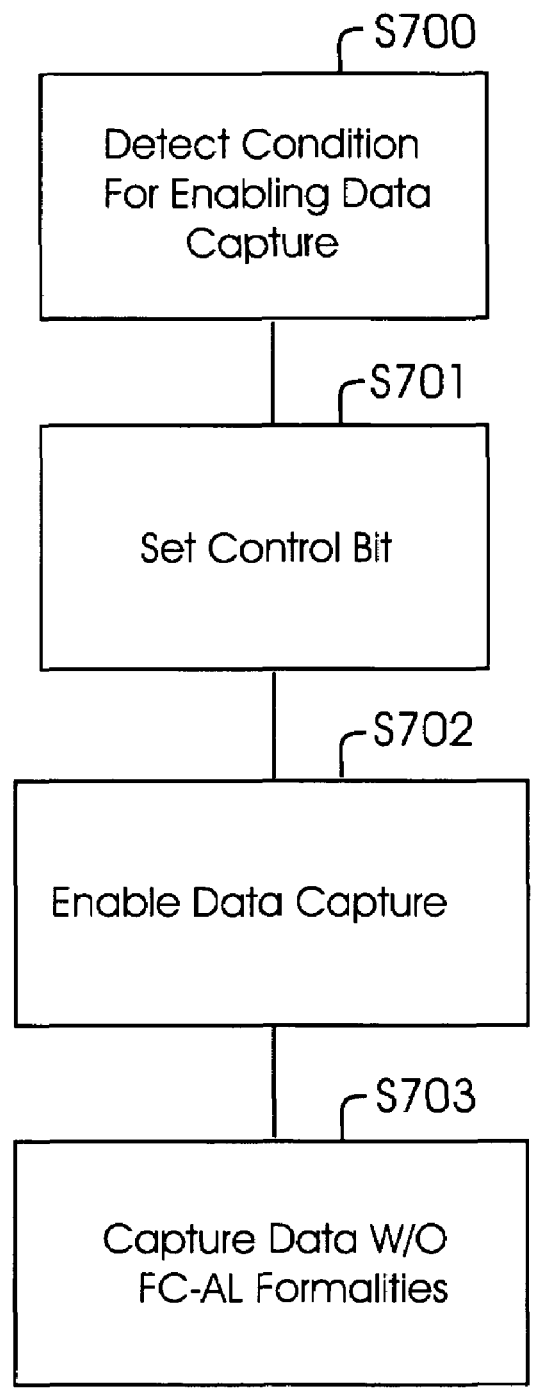
FIG. 7 is a process flow diagram for using a data port, according to one aspect of the present invention.

FIG. 7 shows a process flow diagram for setting up SES module 403 or Diag module 402 to operate in a data capture mode.

Turning in detail to FIG. 7, in step S700 processor 400 detects a condition that requires data capturing.

In step S701, processor 400 sets a control bit to enable data capture and in step S702, data capture is enabled.

In step S703, modules 402 and/or module 403 without following FC-AL formalities capture data. This does not require the use of large set of external buffers.

Some network problems have no clear boundaries for data-capture, thus requiring the capture of all frames until buffer space is exhausted. In such cases, a traditional Data-Capture port with a large set of buffers is needed. However, many problems may be solved which require data-capture but do not require capturing large amounts of data. Problems that are tightly repeating may be solved with sparse data sampling. For example, a FC-AL port with data-capture may discover network topology (a private or public loop) without becoming a participating node, by capturing a FC frame and examining the Arbitrated Loop Physical Address.

Figure 8:
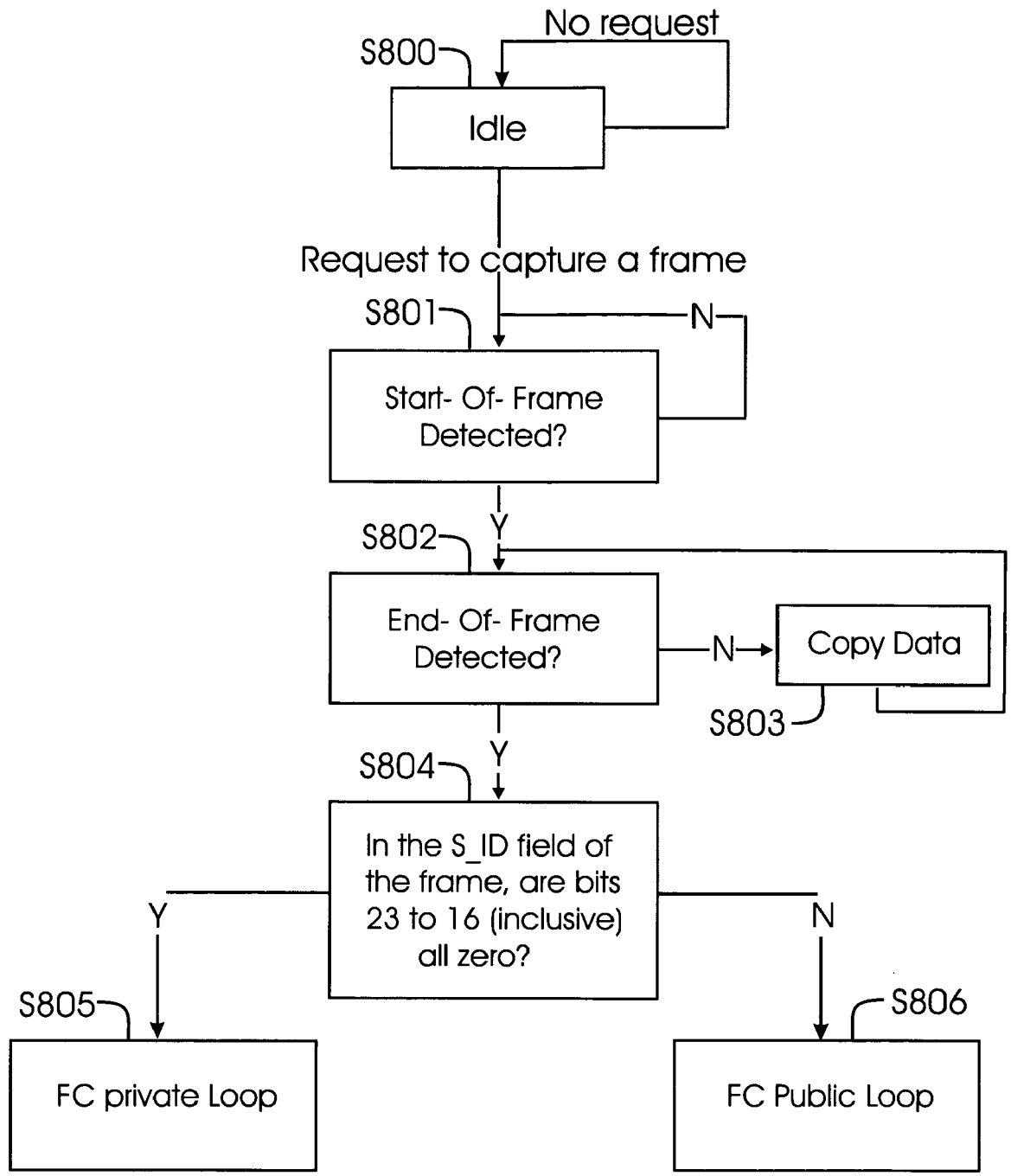
FIG. 8 shows an example of a problem that does not require capturing large amount of data to isolate a problem.

FIG. 8 shows an example of some types of problems that does not require capturing large amount of data in order to isolate a problem, as used by diag module 402 and/or SES module 403. Turning in detail to FIG. 8, in step S800, the process is idle and stays in step S800 while there is no request to capture a frame. When there is a request to capture a frame, the process moves to step S801, and stays in step 801 until the SOF is detected. When SOF is detected in step S801, the process moves to step S802.

In step S802, the process checks for the EOF. If no EOF is detected, then in step S803 the data is copied and the process reverts back to step S802.

In step S804, the process determines if the S_ID field (defined by Fibre Channel Standards) of the frame has bits 23-16 set to zero. If yes, then the loop is private S805, if not, the loop is public S806.

FIG. 8 is only to provide an example of how the present invention may be used for various data capture situations and is not intended to limit the present invention to discover a public or private loop.

In one aspect of the present invention, a data capture port is integrated with a traditional communication port and hence operates as a communication/data capture port. Also, due to intelligent frame filtering, a large set of buffers is not always needed for data capture and hence this reduces the overall cost of the system.

Although the present invention has been described with reference to specific embodiments, these embodiments are illustrative only and not limiting. Many other applications and embodiments of the present invention will be apparent in light of this disclosure and the following claims.

What is claimed:

1. A method for capturing data in a communication port of a fibre channel switch element in a computer network, the method comprising:

a processor in the switch element detecting a condition for enabling data capture;

the processor, in response to the detected condition, setting a control bit to enable the communication port to capture data; and capturing data in the communication port based on the set control bit, and regardless of whether the communication port has available buffer-to-buffer credit;

wherein data capture comprises collecting information from the computer network; and wherein buffer-to-buffer credit limits a number of frames that the communication port may receive before a source port stops sending frames, the source port being a communication port in the computer network that sends frames.

2. The method of claim 1, wherein incoming data is sampled to determine what level of data capture may be required.

3. The method of claim 2, wherein incoming data is sampled to determine if the data is from a private or public loop.

4. A fibre channel switch element in a computer network, comprising:

a diagnostic port in the switch element configured to act as both a traditional communication port and a data capture port depending on the incoming frame data; and a processor in the switch element;

wherein the processor is configured to detect a condition for enabling data capture by the diagnostic port to capture data; and wherein the diagnostic port is configured to capture data based on the set control bit, and regardless of whether the diagnostic port has available buffer-to-buffer credit;

wherein data capture comprises collecting information from computer network; and wherein buffer-to-buffer credit limits a number of frames that the diagnostic port may receive before a source port in another network device stops sending frames, the source port being a communication port in the computer network that sends frames.

5. The switch element of claim 4, wherein the processor is configured to filter incoming frames to enable data capture.

6. The switch element of claim 5, wherein the processor is configured to use frame filtering to determine if a frame is from a public or private loop.

7. The switch element of claim 6, wherein the processor is configured to use a frame source address field (S_ID) to determine if the loop is private or public.

8. The method of claim 3, wherein the processor is configured to use a frame source address field (S_ID) to determine if the loop is private or public.

* * * * *

UNITED STATES PATENT AND TRADEMARK OFFICE
CERTIFICATE OF CORRECTION

PATENT NO. : 7,525,910 B2  
APPLICATION NO. : 10/889635  
DATED : April 28, 2009  
INVENTOR(S) : William J. Wen Page 1 of 1

It is certified that error appears in the above-identified patent and that said Letters Patent is hereby corrected as shown below:

On the first page, in item (57), in column 2, in "Abstract", line 1, delete "fiber" and insert -- fibre --, therefor.

On the first page, in field (57), in column 2, in "Abstract", line 2, delete "fiber" and insert -- fibre --, therefor.

In column 8, line 32, in claim 4, after "on" delete "the".

In column 8, line 35, in claim 4, after "port" insert -- and, in response to the detected condition, to set a control bit to enable the diagnostic port --.

Signed and Sealed this

Thirtieth Day of November, 2010

David J. Kappos  
*Director of the United States Patent and Trademark Office*